(12) United States Patent
Tanogashira et al.

(10) Patent No.: US 10,731,325 B2
(45) Date of Patent: Aug. 4, 2020

(54) SANITARY WASHING DEVICE

(71) Applicant: TOTO LTD., Kitakyushu-shi, Fukuoka (JP)

(72) Inventors: Yuta Tanogashira, Kitakyushu (JP); Shoichi Tsuiki, Kitakyushu (JP); Takeshi Yasugata, Kitakyushu (JP); Masami Tsujita, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 15/992,512

(22) Filed: May 30, 2018

(65) Prior Publication Data

US 2018/0347166 A1 Dec. 6, 2018

(30) Foreign Application Priority Data

Jun. 2, 2017 (JP) ................. 2017-110390

(51) Int. Cl.
*E03D 5/10* (2006.01)
*G01S 13/56* (2006.01)
*E03D 9/08* (2006.01)
*G01S 13/88* (2006.01)

(52) U.S. Cl.
CPC ............... *E03D 5/105* (2013.01); *E03D 9/08* (2013.01); *G01S 13/56* (2013.01); *G01S 13/88* (2013.01)

(58) Field of Classification Search
CPC .................. E03D 9/08; E03D 5/105

USPC ............................................. 4/443
See application file for complete search history.

(56) References Cited

U.S. PATENT DOCUMENTS

2017/0016221 A1* 1/2017 Yamamoto ............. A47K 13/24
2017/0150854 A1* 6/2017 Tsujita ................... A47K 13/12

FOREIGN PATENT DOCUMENTS

CN 101451371 A 6/2009

OTHER PUBLICATIONS

English translation of JP Publication No. 2014-190144A, dated Oct. 6, 2014 in the name of Toto Ltd.

* cited by examiner

*Primary Examiner* — Christine J Skubinna
(74) *Attorney, Agent, or Firm* — Pearne & Gordon LLP

(57) ABSTRACT

According to one embodiment, a sanitary washing device includes a main part, a toilet lid, and a radio wave sensor. The main part includes a toilet lid opening/closing part including a metal. The toilet lid is pivotally supported by the toilet lid opening/closing part to be rotatable with respect to the main part. The radio wave sensor is provided in an interior of the main part and uses a radio wave to detect a user in front of the main part. The radio wave sensor is positioned further frontward than the toilet lid opening/closing part. At least a part of the radio wave sensor overlaps at least a part of the toilet lid opening/closing part in a horizontal direction.

2 Claims, 8 Drawing Sheets

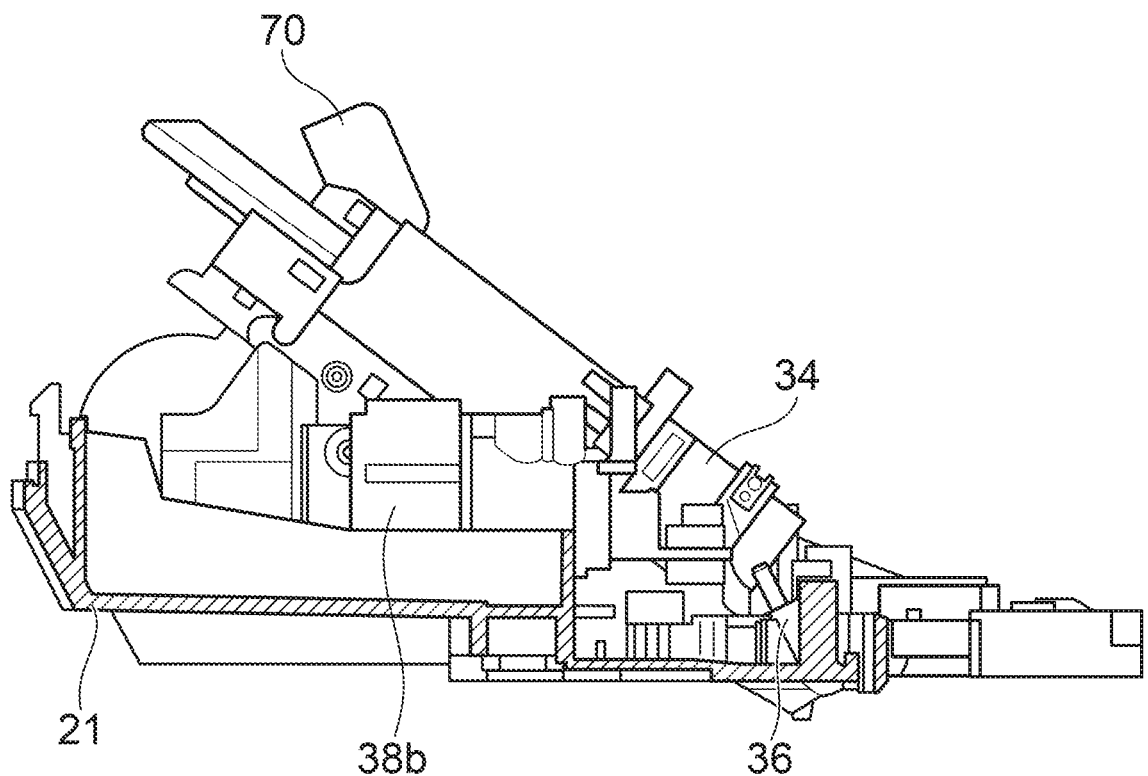
FIG. 7
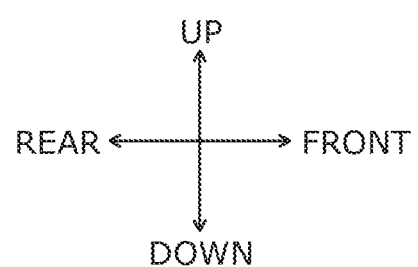

SANITARY WASHING DEVICE

CROSS-REFERENCE TO RELATED APPLICATIONS

This application is based upon and claims the benefit of priority from Japanese Patent Application No. 2017-110390, filed on Jun. 2, 2017; the entire contents of which are incorporated herein by reference.

FIELD

Embodiments described herein relate generally to a sanitary washing device.

BACKGROUND

A sanitary washing device that includes a radio wave sensor detecting a user is known. For example, the entrance of the user into a toilet room, the exit of the user from the toilet room, the user standing in front of an open toilet seat (e.g., the user performing standing urination), etc., can be detected by the radio wave sensor.

The sanitary washing device can execute functions of the sanitary washing device based on the detection result of the radio wave sensor. For example, when the sanitary washing device detects the user entering the toilet room and approaching the toilet, the sanitary washing device automatically opens the toilet lid. Also, for example, when the sanitary washing device detects that the user has finished standing urination and has moved away from the toilet, the sanitary washing device automatically closes the toilet seat and/or the toilet lid, automatically flushes the toilet, etc. It is desirable to suppress the decrease of the detection accuracy of the radio wave sensor of such a sanitary washing device.

BRIEF DESCRIPTION OF THE DRAWINGS

FIG. 7 is a cross-sectional view illustrating a part of the sanitary washing device according to the embodiment;

DETAILED DESCRIPTION

Figure 1:
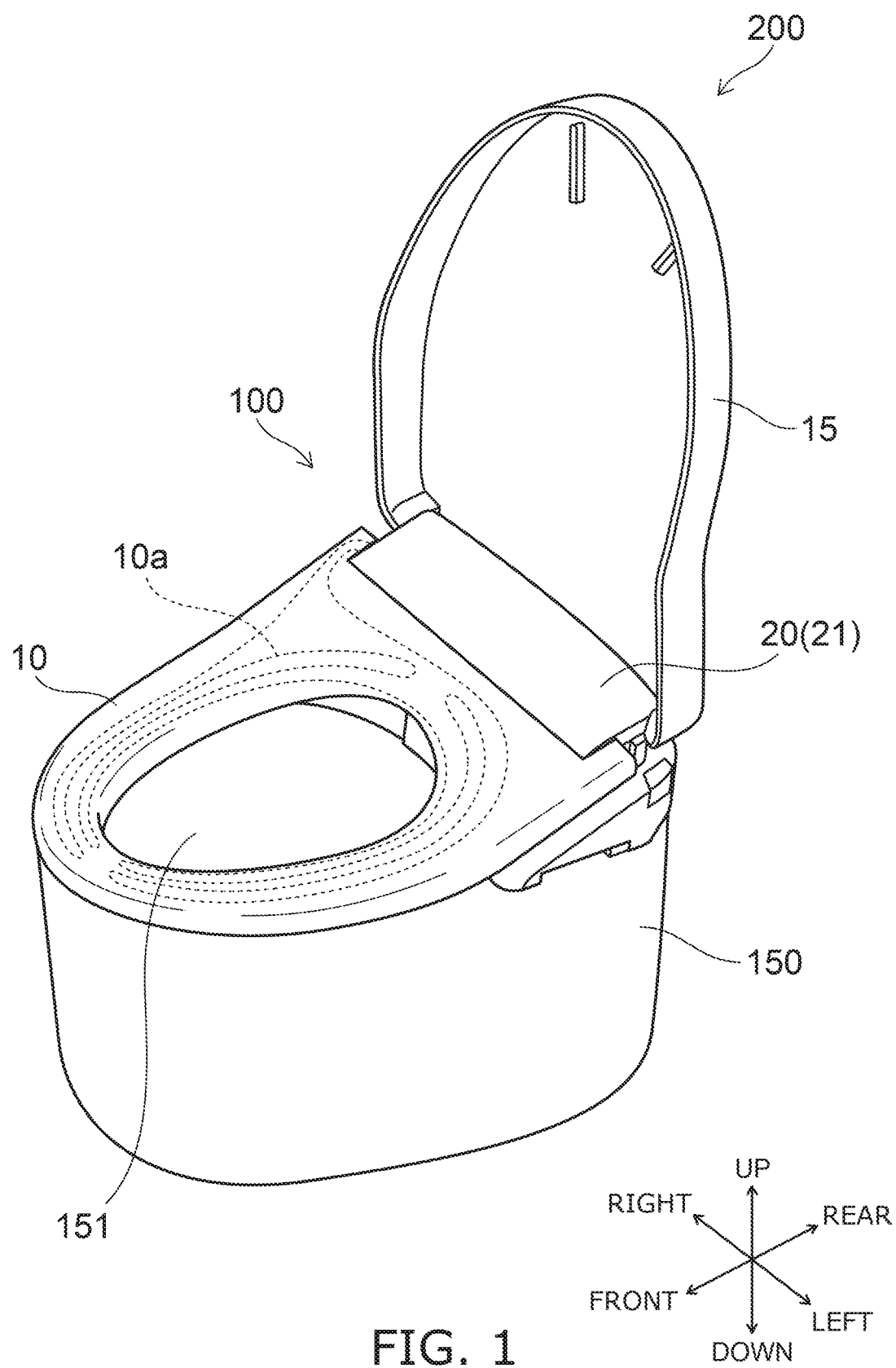
FIG. 1 is a perspective view illustrating a toilet device in which a sanitary washing device according to the embodiment is provided.

A first invention is a sanitary washing device including a main part, a toilet lid, and a radio wave sensor, wherein the main part includes a toilet lid opening/closing part including a metal; the toilet lid is pivotally supported by the toilet lid opening/closing part to be rotatable with respect to the main part; the radio wave sensor is provided in an interior of the main part and uses a radio wave to detect a user in front of the main part; the radio wave sensor is positioned further frontward than the toilet lid opening/closing part; and at least a part of the radio wave sensor overlaps at least a part of the toilet lid opening/closing part in a horizontal direction.

According to the sanitary washing device, a part of the radio wave radiated frontward from the radio wave sensor and returned rearward due to a reflection is reflected frontward by the toilet lid opening/closing part. Thereby, the decrease of the detection accuracy can be suppressed.

A second invention is the sanitary washing device of the first invention that further includes a toilet seat, wherein the main part further includes a toilet seat opening/closing part including a metal; the toilet seat is pivotally supported by the toilet seat opening/closing part to be rotatable with respect to the main part; the toilet seat opening/closing part is positioned further frontward than the toilet lid opening/closing part; and an upper end of the toilet seat opening/closing part is positioned lower than an upper end of the toilet lid opening/closing part.

According to the sanitary washing device, because the toilet seat opening/closing part is positioned lower than the toilet lid opening/closing part, the blocking by the toilet seat opening/closing part of the frontward propagation of the radio wave reflected by the toilet lid opening/closing part can be suppressed. Thereby, the decrease of the detection accuracy can be suppressed further.

A third invention is the sanitary washing device of the first or second invention, wherein at least a part of the radio wave sensor does not overlap the toilet lid opening/closing part in a frontward/rearward direction when viewed from above.

According to the sanitary washing device, because the position of the radio wave sensor is shifted in the left/right direction with respect to the position of the toilet lid opening/closing part, the blocking by the radio wave sensor itself of the frontward propagation of the radio wave reflected by the toilet lid opening/closing part can be suppressed. Thereby, the decrease of the detection accuracy can be suppressed further.

A fourth invention is the sanitary washing device of the second invention, wherein a distance between the radio wave sensor and the toilet seat opening/closing part is shorter than a distance between the radio wave sensor and the toilet lid opening/closing part.

According to the sanitary washing device, the radio wave sensor is disposed at a position that is proximal to the toilet seat opening/closing part, i.e., a position that is proximal to the toilet seat. Thereby, in the state in which the toilet seat is open, the region where the radio wave from the radio wave sensor is blocked by the toilet seat can be narrow. Thereby, the decrease of the detection accuracy can be suppressed further.

Embodiments of the invention will now be described with reference to the drawings. Similar components in the drawings are marked with the same reference numerals; and a detailed description is omitted as appropriate.

FIG. 1 is a perspective view illustrating a toilet device in which a sanitary washing device according to the embodiment is provided.

The toilet device 200 includes the sanitary washing device 100 according to the embodiment and a western-style sit-down toilet (hereinbelow, called simply the "toilet") 150. The sanitary washing device 100 is mounted on the toilet 150.

The sanitary washing device 100 includes a toilet seat 10, a toilet lid 15, and a main part 20. The main part 20 is provided at the rear of the toilet seat 10 and the toilet lid 15. The toilet seat 10 and the toilet lid 15 each are pivotally supported to be rotatable with respect to the main part 20. FIG. 1 shows the state in which the toilet seat 10 is closed (the lowered state) and the state in which the toilet lid 15 is open (the raised state).

In the description of this specification, the directions of "up," "down," "front," "rear," "right," "left," etc., are used. These directions are directions when viewed by a user seated on the toilet seat 10 in the closed state.

The main part 20 includes a casing 21 (a housing) and includes, in the interior of the casing 21, a private part washing function of washing a private part (e.g., the "bottom," etc.) of the user, a drying function of drying a private part of the user by blowing warm air, an electric opening/closing function of using electric power to open and close the toilet seat 10 and the toilet lid 15, etc.

Figure 2:
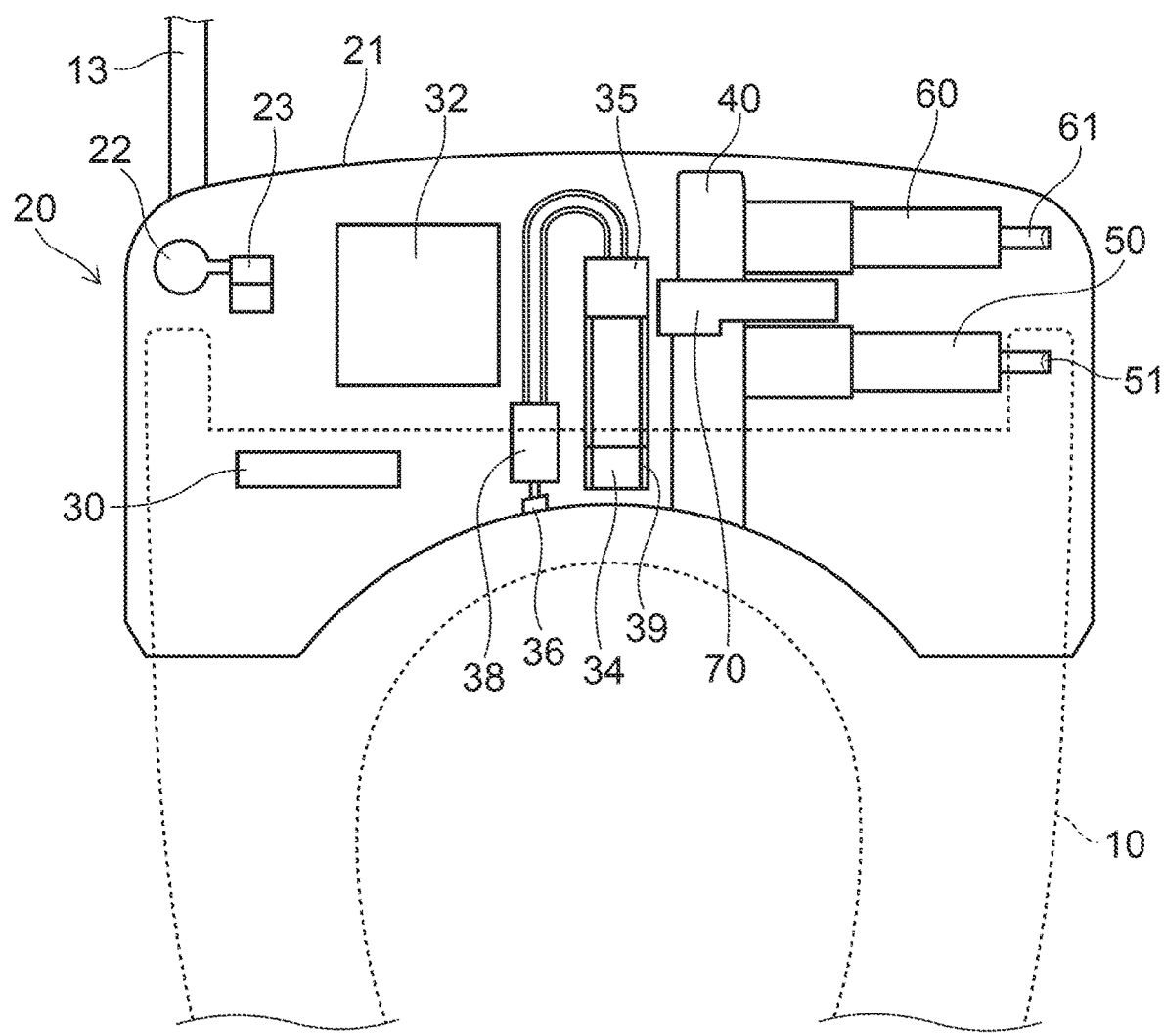
FIG. 2 is a plan view illustrating a part of the sanitary washing device according to the embodiment.

FIG. 2 is a plan view illustrating a part of the sanitary washing device according to the embodiment.

FIG. 2 schematically shows the interior of the casing 21 of the main part 20. The toilet seat 10 is shown by the broken line. As shown in FIG. 2, a warm water heater 30, a control circuit 32, a first nozzle 34, a nozzle motor 35, a second nozzle 36, a flow channel switching unit 38, an air supply unit 40, a toilet seat opening/closing part 50, a toilet lid opening/closing part 60, a radio wave sensor 70, etc., are provided in the interior of the main part 20.

The control circuit 32 includes a microcomputer, etc. The control circuit 32 controls the operations of a solenoid valve 23, the warm water heater 30, the nozzle motor 35, the flow channel switching unit 38, the air supply unit 40, the toilet seat opening/closing part 50, the toilet lid opening/closing part 60, etc., based on signals from the radio wave sensor 70, a remote control (not illustrated), etc.

Water is supplied to the main part 20 via a water supply part 22 from a water supply pipe 13 connected to a service water line, a water storage tank, etc. The solenoid valve 23 is provided on the downstream side of the water supply part 22. The solenoid valve 23 switches between water shutoff and water supply downstream of the solenoid valve 23 based on a signal from the control circuit 32.

The warm water heater 30 is provided downstream of the solenoid valve 23. The warm water heater 30 heats the supplied water and converts the supplied water into warm water. The warm water heater 30 is, for example, an instantaneously-heating (instantaneous-type) heat exchanger that uses a ceramic heater, etc. A stored-hot-water heat exchanger that uses a hot water storage tank may be used.

The flow channel switching unit 38 is provided downstream of the warm water heater 30. The flow channel switching unit 38 performs the switching and the opening and closing of the flow channels of water flowing toward the first nozzle 34, the second nozzle 36, and a nozzle wash chamber 39. In the example, the flow channel switching unit 38 functions also as a flow regulation unit that adjusts the flow rate downstream of the flow channel switching unit 38. However, the flow channel switching unit and the flow rate switch unit may be provided separately.

The first nozzle 34, the nozzle wash chamber 39, and the second nozzle 36 are provided downstream of the flow channel switching unit 38.

The first nozzle 34 receives a drive force from the nozzle motor 35, can advance into a bowl 151 of the toilet 150, and can retract into the interior of the casing 21. That is, the nozzle motor 35 can cause the first nozzle 34 to advance and retract based on a signal from the control circuit 32.

Multiple water discharge ports 34e (referring to FIG. 6B) are provided in the tip of the first nozzle 34. The multiple water discharge ports 34e include a bottom wash water discharge port used for a bottom wash, a bidet wash water discharge port used for a bidet wash, etc. Multiple flow channels (a bottom wash flow channel and a bidet wash flow channel) that guide the water to the multiple water discharge ports 34e are provided downstream of the flow channel switching unit 38.

The first nozzle 34 in the state of being advanced from the casing 21 can wash a private part (e.g., the "bottom," etc.) of the user seated on the toilet seat 10 by discharging, from one of the water discharge ports 34e, the water supplied from the flow channel switching unit 38. The water discharge port 34e that performs the water discharge is switched by the flow channel switching unit 38 switching the flow channel. For example, the water is discharged from the bottom wash water discharge port by the flow channel switching unit 38 switching the flow channel to the bottom wash flow channel; and the water is discharged from the bidet wash water discharge port by the flow channel switching unit 38 switching the flow channel to the bidet wash flow channel.

Also, a flow channel (a surface cleaning flow channel) that guides the water to the nozzle wash chamber 39 is provided downstream of the flow channel switching unit 38. The water is supplied to the nozzle wash chamber 39 by the flow channel switching unit 38 switching the flow channel to the surface cleaning flow channel. The nozzle wash chamber 39 washes the outer circumferential surface (the central body) of the first nozzle 34 by spraying water from a water discharger provided in the interior of the nozzle wash chamber 39.

Also, a flow channel (a spray flow channel) that guides the water to the second nozzle 36 is provided downstream of the flow channel switching unit 38. The water is supplied to the second nozzle 36 by the flow channel switching unit 38 switching the flow channel to the spray flow channel. The second nozzle 36 discharges the supplied water in a mist-like form toward the interior of the bowl 151 of the toilet 150.

The toilet seat opening/closing part 50 includes a rotation shaft 51 that pivotally supports the toilet seat 10. Also, a mechanism (a motor, a gear, etc.) that engages the rotation shaft 51 is provided in the interior of the toilet seat opening/closing part 50. The motor that is in the interior of the toilet seat opening/closing part 50 can open and close the toilet seat 10 by operating based on a signal from the control circuit 32.

Similarly, the toilet lid opening/closing part 60 includes a rotation shaft 61 that pivotally supports the toilet lid 15. Also, a mechanism (a motor, a gear, etc.) that engages the rotation shaft 61 is provided in the interior of the toilet lid opening/closing part 60. The motor that is in the interior of the toilet lid opening/closing part 60 can open and close the toilet lid 15 by operating based on a signal from the control circuit 32.

A fan and/or a heater is provided in the interior of the air supply unit 40. The fan blows air onto a private part of the user seated on the toilet seat 10. The heater warms the air forced through the interior of the air supply unit 40 by the fan. Thereby, warm air can be blown toward the private part of the user.

A metal member 10a (referring to FIG. 1 or the like) is provided in the interior of the toilet seat 10 as a heater for warming the seating surface. The metal member 10a is provided along the periphery of the opening of the toilet seat. When the user is seated on the toilet seat 10, the toilet seat 10 is warmed by providing a flow of current to the metal member 10a. For example, a tubing heater, a sheathed heater, a halogen heater, a carbon heater, or the like is used as the heater provided in the toilet seat 10. The metal member 10a includes, for example, aluminum, copper, etc. Various configurations such as a sheet configuration, a wire configuration, a mesh configuration, etc., may be employed as the configuration of the metal member 10a.

Figure 3:
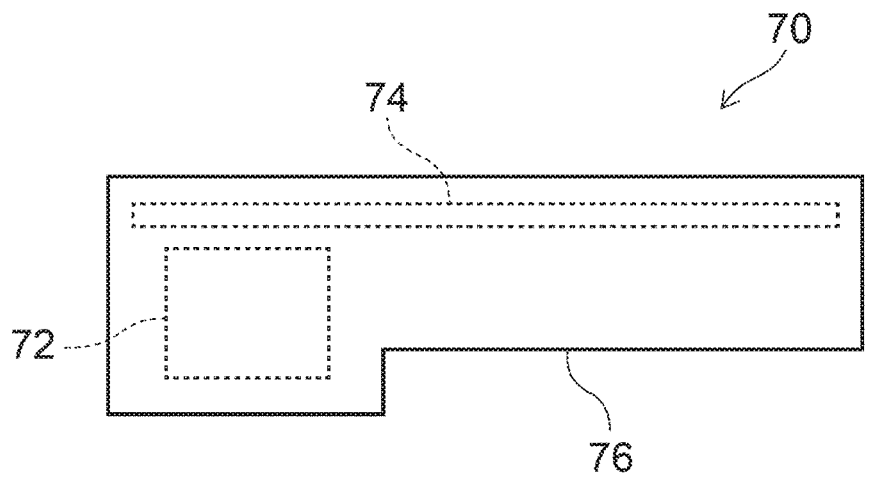
FIG. 3 is an exploded perspective view illustrating the radio wave sensor according to the embodiment.

FIG. 3 is an exploded perspective view illustrating the radio wave sensor according to the embodiment.

The radio wave sensor 70 is, for example, a doppler sensor utilizing the doppler effect. In the example, the radio wave sensor 70 includes a radio wave transmitter/receiver 72 and a controller 74.

The radio wave transmitter/receiver 72 includes, for example, a circuit and detects the detection object (the user) by radiating a high frequency radio wave such as a microwave, a millimeter wave, or the like, and receives the reflected wave from the detection object. Information that relates to the state of the detection object is included in the reflected wave.

The controller 74 is a circuit board in which a control circuit such as a microcomputer or the like is formed; and the controller includes a metal (e.g., copper, aluminum, etc.). The controller 74 determines the state of the detection object based on the radio wave radiated by the radio wave transmitter/receiver 72 and the reflected wave received by the radio wave transmitter/receiver 72 and outputs, to the control circuit 32, a signal relating to the determination result (i.e., the detection result of the radio wave sensor 70). Based on this signal, the control circuit 32 opens and closes the toilet seat 10, opens and closes the toilet lid 15, flushes the toilet 150, heats the toilet seat 10, performs the operation control of the first nozzle 34 (the nozzle motor 35), performs the operation control of the flow channel switching unit 38, etc.

In this specification, the range of the "state of the detection object" determined by the controller 74 includes at least one of the presence or absence of the detection object or the movement (whether or not there is movement, the movement direction, the speed, etc.) of the detection object. The range of the "state of the detection object" may include not only the user approaching and moving away but also being seated and rising.

The radio wave transmitter/receiver 72 is mounted to be connected to the controller 74. The radio wave transmitter/receiver 72 and the controller 74 are stored inside a case 76 as one module. The radio wave sensor 70 is fixed inside the casing 21 of the main part 20. The position and the orientation of the radio wave sensor 70 do not change between the state in which the toilet seat 10 and the toilet lid 15 are open and the state in which the toilet seat 10 and the toilet lid 15 are closed. That is, the direction (the maximum directivity direction) in which the radio wave is radiated from the radio wave sensor 70 does not change even when the toilet seat 10 and/or the toilet lid 15 are opened and closed.

The maximum directivity direction of the radio wave means the direction in which a maximum value occurs in the intensity distribution of the radiated radio wave. In the embodiment, a maximum directivity direction D of the radio wave radiated from the radio wave sensor 70 (referring to FIG. 5) is a direction toward the front and is oriented upward from the horizontal direction. In the case where a radio wave that has maximum values in multiple directions is radiated from the radio wave sensor 70, it is sufficient for at least one of the multiple directions to be tilted toward the upper side of the horizontal direction.

As shown in FIG. 2, the radio wave sensor 70 is disposed above the air supply unit 40. The radio wave sensor 70 is positioned further frontward than the toilet lid opening/closing part 60 and is positioned further rearward than the toilet seat opening/closing part 50.

The configuration of the water system (the flow channels of the water, the warm water heater 30, etc.) and the control circuit 32 are provided on the right of the first nozzle 34; and the configuration of the air supply system (the air supply unit 40, a deodorizing unit (not illustrated), etc.), the toilet seat opening/closing part 50, and the toilet lid opening/closing part 60 are provided on the left of the first nozzle 34. The radio wave sensor 70 is provided on the side opposite to the configuration of the water system when viewed from the first nozzle 34. Thereby, the reflecting or the blocking of the radio wave from the radio wave sensor 70 by the water can be suppressed; and the obstruction of the transmission and reception of the radio wave can be suppressed. Also, the effects on the radio wave sensor 70 of the electromagnetic noise emitted by the control circuit 32 can be suppressed.

Figure 4:
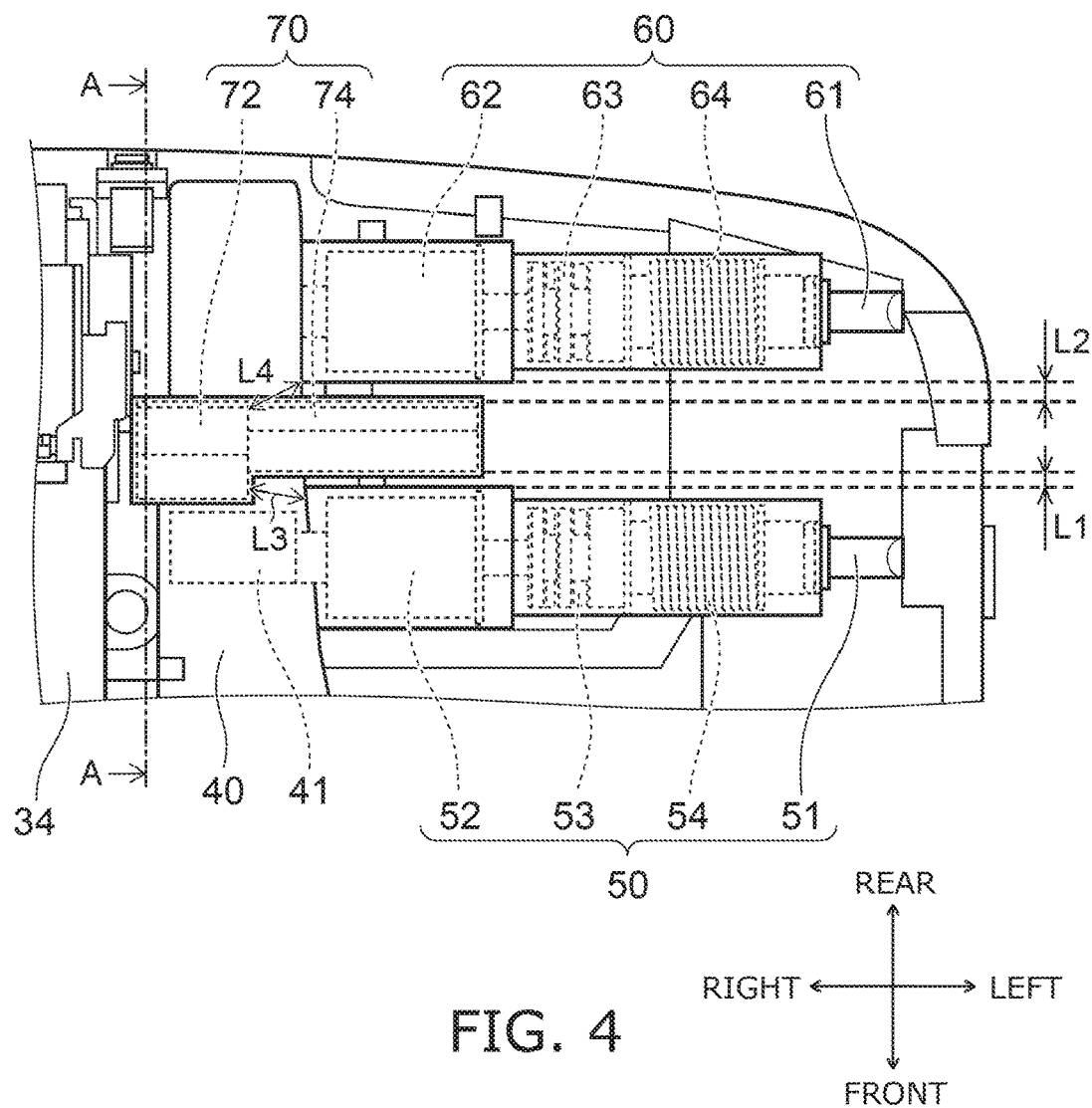
FIG. 4 is a plan view illustrating a part of the sanitary washing device according to the embodiment.

FIG. 4 is a plan view illustrating a part of the sanitary washing device according to the embodiment.

Figure 5:
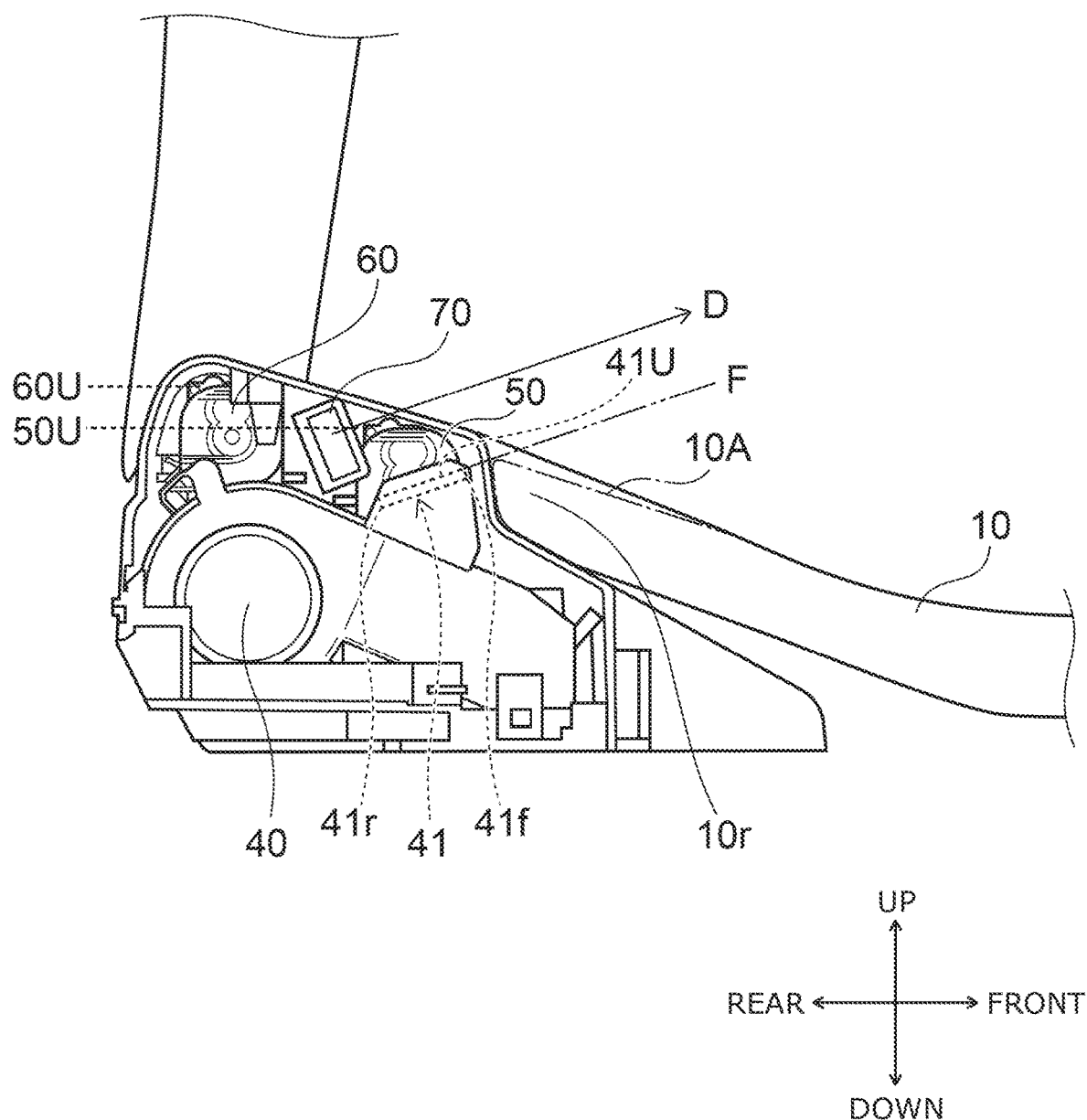
FIG. 5 is a cross-sectional view illustrating a part of the sanitary washing device according to the embodiment.

FIG. 5 is a cross-sectional view illustrating a part of the sanitary washing device according to the embodiment.

FIG. 4 shows an enlarged vicinity of the radio wave sensor 70. FIG. 5 shows a cross section along line A-A shown in FIG. 4.

The toilet seat opening/closing part 50 is positioned at the front of the toilet lid opening/closing part 60. As shown in FIG. 4, the toilet seat opening/closing part 50 includes a motor 52, a gear 53, and a spring 54 in the interior of the toilet seat opening/closing part 50. Similarly, the toilet lid opening/closing part 60 includes a motor 62, a gear 63, and a spring 64 in the interior of the toilet lid opening/closing part 60. The toilet seat opening/closing part 50 and the toilet lid opening/closing part 60 each include a metal. That is, the motors, the gears, and the springs each may include metal members. The metal may be any metal such as aluminum, copper, etc. Also, a resin, etc., may be included in a part of the motors, the gears, and the springs.

As shown in FIG. 5, the height (the position in the up/down direction) of at least a part of the radio wave sensor 70 is substantially the same as the height of at least a part of the toilet lid opening/closing part 60. In other words, at least a part of the radio wave sensor 70 overlaps at least a part of the toilet lid opening/closing part 60 in the horizontal direction. In other words, when viewed from the side as in FIG. 5, at least a part of the radio wave sensor 70 is disposed within the area of the toilet lid opening/closing part 60 projected frontward.

As described above, the radio wave sensor 70 radiates the radio wave mainly toward the front. There are cases where a part of the radio wave radiated frontward from the radio wave sensor 70 is reflected by the main part 20 and/or the toilet seat 10 and undesirably returns rearward. Therefore, the detection accuracy of the radio wave sensor 70 frontward may decrease. Here, the toilet seat opening/closing part 50 and the toilet lid opening/closing part 60 include a metal. Therefore, the toilet seat opening/closing part 50 and the toilet lid opening/closing part 60 reflect the radio wave. In the embodiment, by arranging the toilet lid opening/closing part 60 and the radio wave sensor 70 as described above, a part of the radio wave radiated frontward from the radio wave sensor 70 and returned rearward is reflected frontward by the toilet lid opening/closing part 60. That is, a part of the radio wave returned rearward is again returned frontward. Thereby, the decrease of the detection accuracy can be suppressed because the radio wave can be caused to propagate frontward of the main part with a minimum loss.

The height of at least a part of the radio wave sensor 70 is substantially the same as the height of at least a part of the toilet seat opening/closing part 50. In other words, at least a part of the radio wave sensor 70 overlaps at least a part of the toilet seat opening/closing part 50 in the horizontal direction. In other words, at least a part of the radio wave sensor 70 is disposed within the area of the toilet seat opening/closing part 50 projected rearward when viewed from the side as in FIG. 5.

The toilet seat opening/closing part 50 is provided at a position that is lower than the toilet lid opening/closing part 60. That is, an upper end 50U of the toilet seat opening/closing part 50 is positioned lower than an upper end 60U of the toilet lid opening/closing part 60. Thereby, the obstruction by the toilet seat opening/closing part 50 of the propagation of the radio wave radiated from the radio wave sensor 70 and reflected frontward by the toilet lid opening/closing part 60 can be suppressed. Thereby, the user can be detected more efficiently.

As shown in FIG. 4, the position of the radio wave sensor 70 is shifted in the left/right direction with respect to the positions of the toilet seat opening/closing part 50 and the toilet lid opening/closing part 60. In other words, at least a part of the radio wave sensor 70 does not overlap the toilet seat opening/closing part 50 and the toilet lid opening/closing part 60 in the frontward/rearward direction when viewed from above. In the example, the radio wave transmitter/receiver 72 of the radio wave sensor 70 is disposed further rightward than the toilet seat opening/closing part 50 and the toilet lid opening/closing part 60. Thus, by shifting in the left/right direction, the obstruction by the radio wave sensor 70 itself of the frontward propagation of the radio wave radiated from the radio wave sensor 70 and reflected by the toilet lid opening/closing part 60 can be suppressed.

In the state in which the toilet seat 10 is closed as shown in FIG. 4 and FIG. 5, a circuit board 41 is provided between the toilet seat 10 and the radio wave sensor 70. In the example, the circuit board 41 is a circuit that controls the operation of the heater of the air supply unit 40 based on the signal from the control circuit 32 of the main part 20. The circuit board 41 includes a metal member. The metal member may be any metal such as aluminum, copper, etc.

For example, if the arrangement of the radio wave sensor is inappropriate, there are cases where the radio wave that is radiated from the radio wave transmitter/receiver is blocked, reflected, or refracted by a member (a resin or a metal member of the heater) of the sanitary washing device; thereby, the radio wave does not propagate easily toward the user. Therefore, there is a risk that the accuracy of detecting the user may decrease. In particular, the propagation of the radio wave radiated from the radio wave sensor may be obstructed by the resin forming the toilet seat and/or the metal heater provided in the interior of the toilet seat in the case where the toilet seat is positioned at the front of the radio wave sensor.

Conversely, in the embodiment as shown in FIG. 4 and FIG. 5, the circuit board 41 that includes the metal member is positioned between the toilet seat 10 and the radio wave sensor 70 (the radio wave transmitter/receiver 72) at the rear part of the toilet seat 10. The circuit board 41 is disposed at the vicinity of the radio wave sensor 70 so that the circuit board 41 reflects the radio wave radiated from the radio wave sensor 70 and propagating toward the toilet seat 10 in the state in which the toilet seat 10 is closed. Thereby, the obstruction by the toilet seat 10 of the propagation of the radio wave radiated from the radio wave sensor 70 can be suppressed.

More specifically, as shown in FIG. 5, the upper part (an edge part 41f at the front) of the circuit board 41 is disposed to overlap the lower part of the radio wave sensor 70 in the frontward/rearward direction. An edge part 41r at the rear of the circuit board 41 is disposed not to overlap the lower part of the radio wave sensor 70 in the frontward/rearward direction. That is, the circuit board 41 is disposed to be tilted with respect to the frontward/rearward direction.

The maximum directivity direction D of the radio wave radiated from the radio wave sensor is oriented upward from the horizontal direction. The maximum directivity direction D passes above the circuit board 41. For example, an upper surface 41U of the circuit board 41 is disposed to be aligned with the maximum directivity direction D. The state of the upper surface 41U being aligned with the maximum directivity direction D is a state in which the angle between the upper surface 41U and the maximum directivity direction D is, for example, 10° or less. In the example shown in FIG. 5, the upper surface 41U is parallel to the maximum directivity direction D. The upper surface 41U is the major surface of the substrate where the circuit is formed.

By such an arrangement, the radio wave that is radiated in the maximum directivity direction D from the radio wave sensor 70 can propagate without being incident on the circuit board 41. Also, because the radio wave that is radiated downward from the horizontal direction from the radio wave sensor 70 is reflected upward and frontward by the circuit board 41, the radio wave does not propagate downward easily and is not easily incident on the toilet seat 10. Thereby, the radio wave is caused to propagate more easily toward the user; and the decrease of the detection accuracy can be suppressed.

As shown in FIG. 5, a part 10r at the rear part of the toilet seat 10 overlaps the lower part of the radio wave sensor 70 and the edge part 41r at the rear of the circuit board 41 in the frontward/rearward direction in the state in which the toilet seat 10 is closed. Also, the maximum directivity direction D passes above the toilet seat 10. Thereby, the radio wave that is radiated in the maximum directivity direction D from the radio wave sensor 70 is not incident on the toilet seat 10. Accordingly, the radio wave propagates easily toward the user; and the decrease of the detection accuracy can be suppressed.

As in a toilet seat 10A shown by the single dot-dash line in FIG. 5, the toilet seat may be provided to be relatively lower than the circuit board 41 so that the extension line (an extension plane F) of the upper surface 41U of the circuit board 41 does not cross the toilet seat 10. Thereby, the incidence on the toilet seat 10A of the radio wave radiated from the radio wave sensor 70 and reflected by the circuit board 41 is suppressed. The radio wave propagates easily toward the user; and the decrease of the detection accuracy can be suppressed.

Figure 6A:
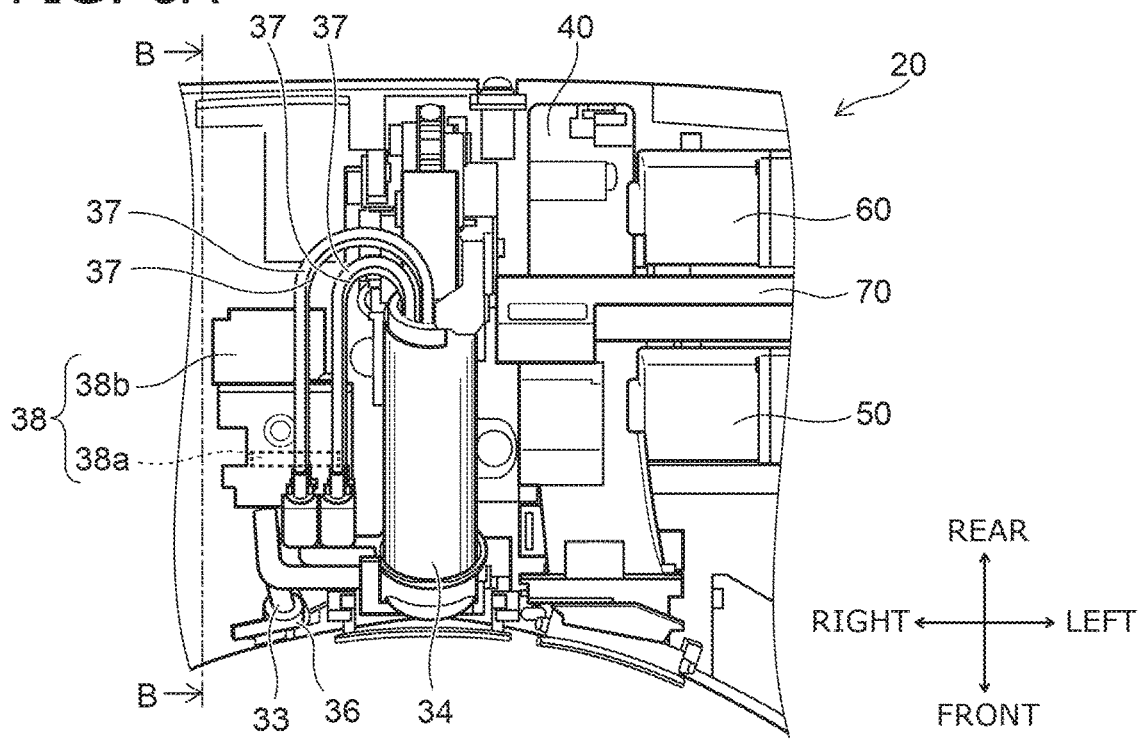
FIG. 6A and FIG. 6B are plan views illustrating a part of the sanitary washing device according to the embodiment.
Figure 6B:
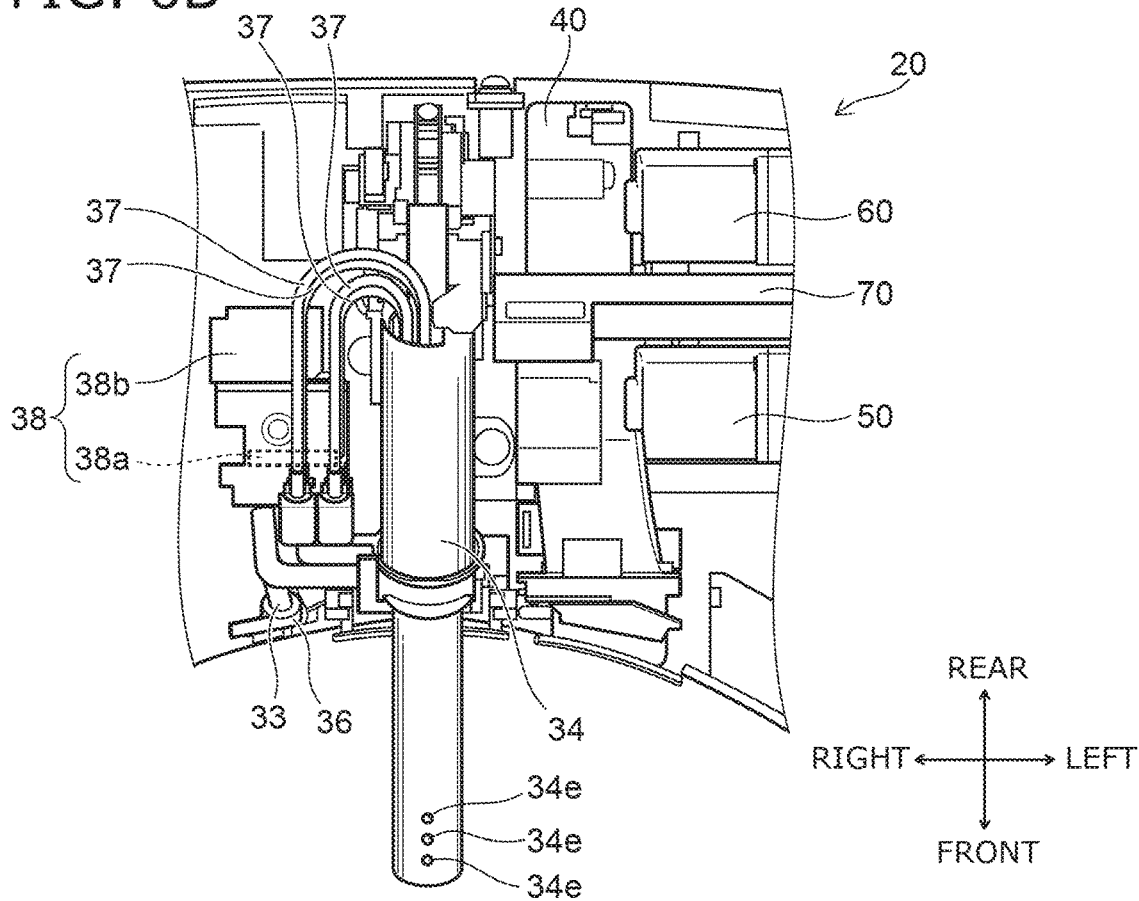

FIG. 6A and FIG. 6B are plan views illustrating a part of the sanitary washing device according to the embodiment.

FIG. 7 is a cross-sectional view illustrating a part of the sanitary washing device according to the embodiment.

FIG. 6A and FIG. 6B show an enlarged vicinity of the first nozzle 34. FIG. 6A is the state in which the first nozzle 34 is contracted and stored inside the casing 21 of the main part 20. FIG. 6B is the state in which the first nozzle 34 is elongated and advanced from the casing 21 of the main part 20.

FIG. 7 shows a cross section along line B-B shown in FIG. 6A. Some of the components are not illustrated in FIG. 7 for easier viewing.

The main part 20 includes multiple first nozzle hoses 37. The first nozzle hoses 37 each are connected to the first nozzle 34 and the flow channel switching unit 38 and supply the water from the flow channel switching unit 38 to the first nozzle 34. The multiple first nozzle hoses 37 are multiple flow channels (the bottom wash flow channel and the bidet wash flow channel) that guide the water to the multiple water discharge ports 34e.

The main part 20 includes a second nozzle hose 33. The second nozzle hose 33 is connected to the second nozzle 36 and the flow channel switching unit 38 and supplies the water from the flow channel switching unit 38 to the second nozzle 36. The second nozzle hose 33 is the spray flow channel that guides the water to the second nozzle 36.

The flow channel switching unit 38 includes a rotor 38a having multiple holes through which the water passes, and a motor 38b that rotates the rotor 38a. The hole through which the water passes is switched by rotating the rotor 38a by an operation of the motor 38b. Thereby, the flow channel switching unit 38 can switch the flow channel of the water flowing toward the first nozzle 34 or the second nozzle 36. That is, the flow channel switching unit 38 selects the hose among the multiple first nozzle hoses 37 and the second nozzle hose 33 through which the water is caused to flow. For example, the flow channel switching unit 38 can switch between the state in which the water flows into the first nozzle 34 (the first nozzle hoses 37) and the state in which the water flows into the second nozzle 36 (the second nozzle hose 33) by the operation of the motor 38b.

Figure 8:
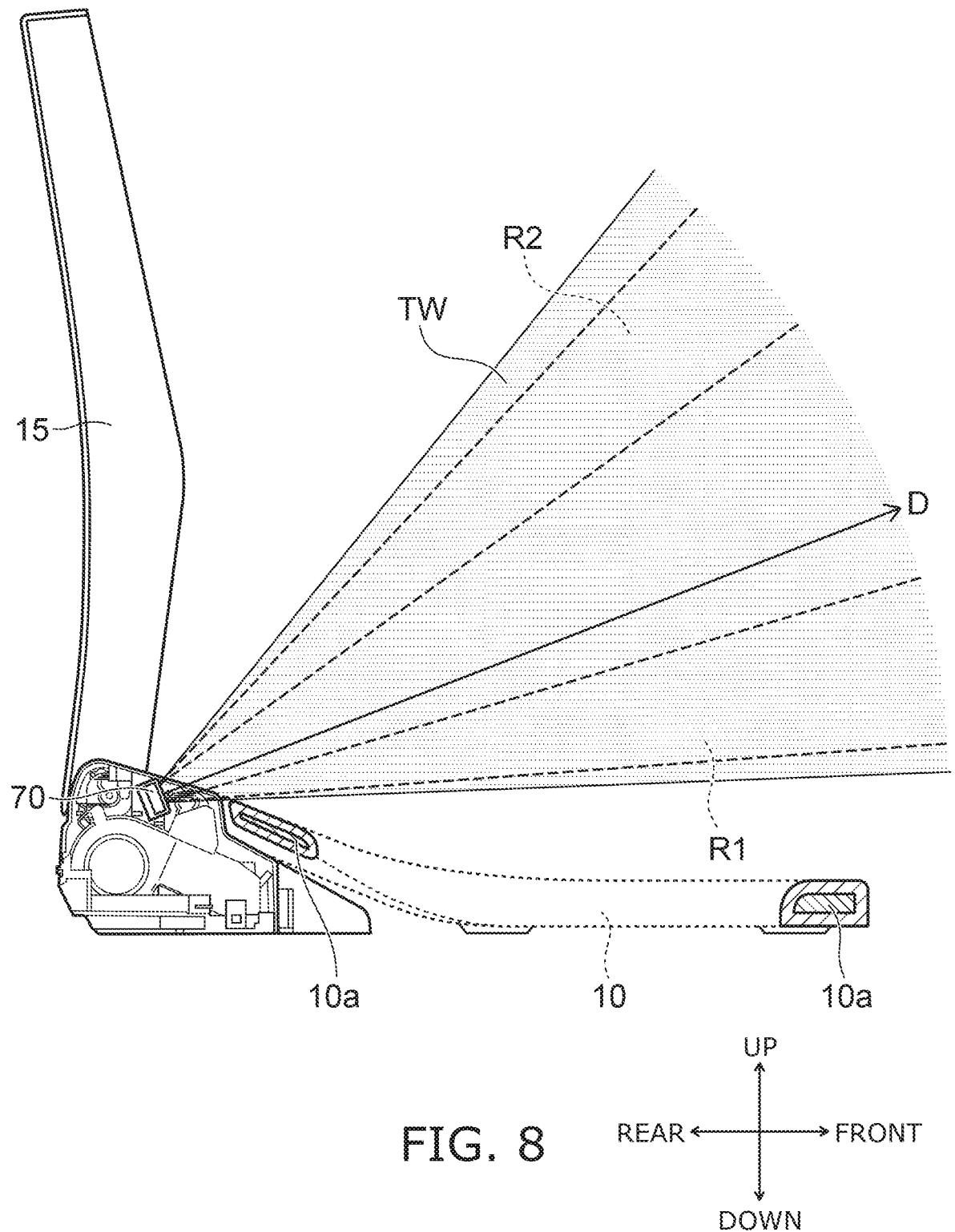
FIG. 8 is a cross-sectional views illustrating the sanitary washing device according to the embodiment.
Figure 9:
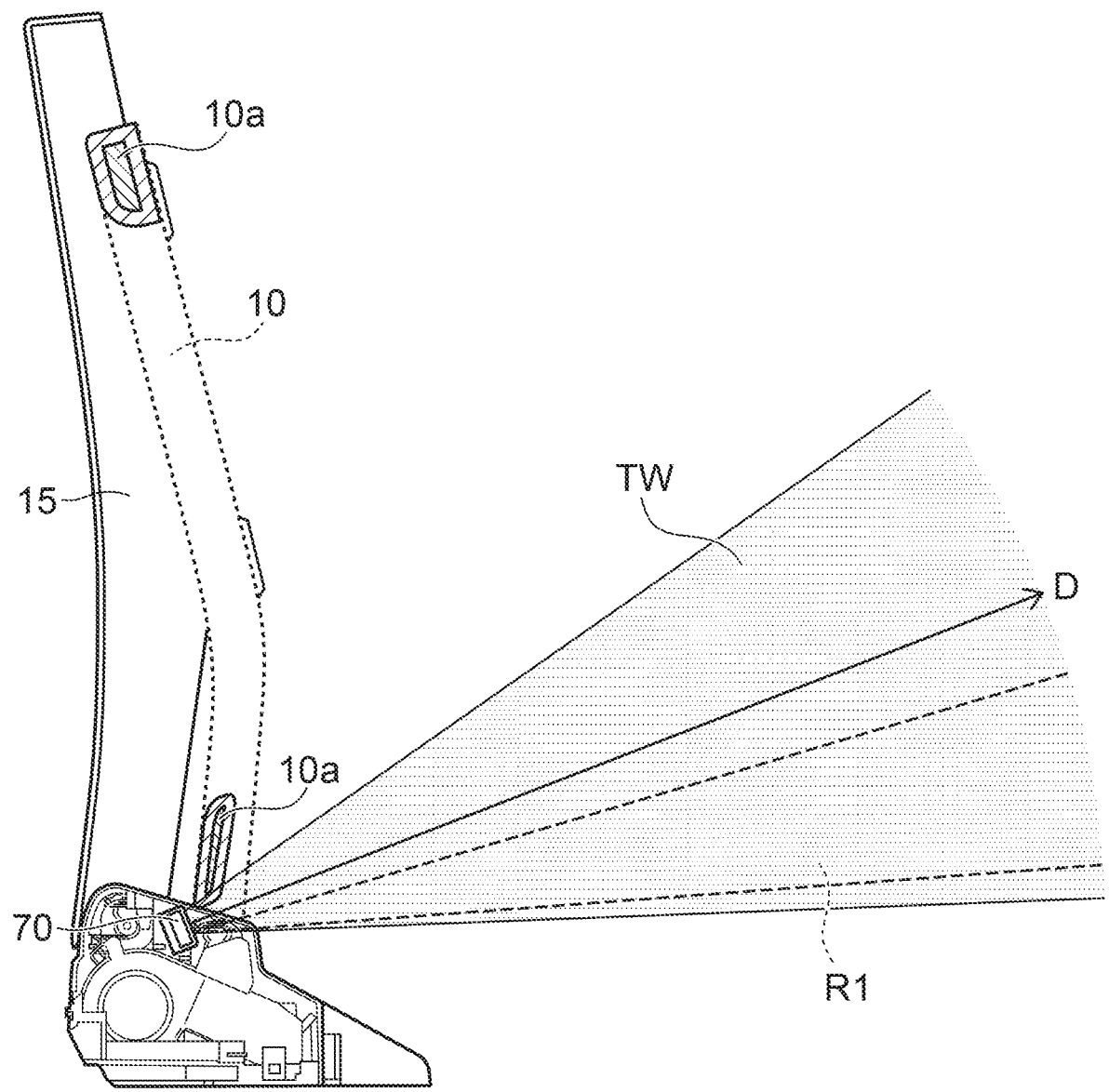
FIG. 9 is a cross-sectional views illustrating the sanitary washing device according to the embodiment.
Figure 9:
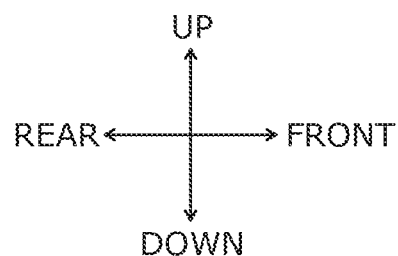

FIG. 8 and FIG. 9 are cross-sectional views illustrating the sanitary washing device according to the embodiment.

FIG. 8 illustrates the state in which the toilet seat 10 is closed; and FIG. 9 illustrates the state in which the toilet seat 10 is open. The toilet lid 15 is in the open state in FIG. 8 and FIG. 9.

In the state in which the toilet seat 10 is closed as shown in FIG. 8, the maximum directivity direction D of a radio wave TW radiated from the radio wave sensor 70 passes above the toilet seat 10. In the state in which the toilet seat 10 is closed, the radio wave TW is radiated in a range including a first region R1, and a second region R2 that is higher than the first region R1. Thereby, the radio wave sensor 70 can detect the user existing in at least one of the first region R1 or the second region R2. The first region R1 is, for example, a part of the region that is lower than the maximum directivity direction D. The second region R2 is, for example, a part of the region that is higher than the maximum directivity direction D.

In the state in which the toilet seat 10 is open as shown in FIG. 9, the maximum directivity direction D passes below the toilet seat 10.

The toilet lid 15, the contour of the toilet seat 10, and the casing 21 of the main part 20 include materials such as resins, etc., that easily transmit radio waves. On the other hand, a metal (e.g., the metal member 10a in the toilet seat 10 interior or the like) reflects radio waves without transmitting. Therefore, the radio wave that passes below the toilet seat 10 propagates frontward as-is; but a part of the radio wave incident on the toilet seat 10 is reflected by the metal member 10a and does not propagate frontward. As a result, in the state in which the toilet seat 10 is open, the radio wave TW is radiated in the first region R1 but is not radiated in the second region R2 shown in FIG. 8.

In other words, the first region R1 is a region where the propagation of the radio wave TW is not obstructed by the toilet seat 10; and the second region R2 is a region where the propagation of the radio wave TW is blocked by the open toilet seat 10. In the state in which the toilet seat 10 is open, the user that is in front of the main part 20 is not detected in the second region R2 by the radio wave sensor; and the user that is in front of the main part 20 is detected in the first region R1 by the radio wave sensor. On the other hand, in the state in which the toilet seat 10 is closed, the user that is in front of the main part 20 is detected in the first region R1 and the second region R2 by the radio wave sensor 70.

A faint radio wave may be radiated in the second region R2. In other words, here, the radio wave not being radiated in the second region R2 includes the case where a faint radio wave that is insufficient to detect a human body is radiated in the second region R2 in addition to the case where no radio waves are radiated in the second region R2.

Generally, the operation of the user standing in front of the open toilet seat is small compared to the operation of the user entering and exiting the toilet room. For example, the user that is performing standing urination substantially does not move in front of the toilet. Therefore, there are cases where the detecting of the standing urination operation of the user is relatively difficult. If the movement of the user performing standing urination cannot be detected, there is a risk that it may be detected that the use of the toilet device has ended even though the user is performing standing urination. In the case where the toilet device receives the detection result and flushes the toilet, opens and closes the toilet seat, etc., if there is such a misdetection, there is a possibility that the toilet may be flushed or the toilet seat and/or the toilet lid may be closed while standing urination is being performed. To detect the user performing standing urination, it is desirable for the radio wave sensor to be able to detect a slight fluctuation of the user.

Therefore, a method may be considered in which the sensing sensitivity is increased by increasing the reception sensitivity of the radio wave of the radio wave sensor. However, if the sensitivity is increased, there is a risk that the effects of the noise also may become large; and misdetection undesirably may occur easily. If the radio wave sensor is undesirably affected by the noise, a misdetection that the user exists in front of the toilet may occur even though the user does not exist in front of the toilet; and there is a possibility that the toilet may not be flushed or the toilet seat and/or the toilet lid may not be closed even when the user has moved away from the front of the toilet.

For example, there are cases where the radio wave that is radiated from the radio wave sensor is reflected by an external device (e.g., a fluorescent lamp, a ventilation fan, etc.) positioned higher; and the reflected wave passes through the second region R2 toward the radio wave sensor. Such a reflected wave may cause noise when detecting the user. Also, for example, in the second region R2 that is positioned higher, radio waves other than the reflected wave of the radio wave radiated from the radio wave sensor (e.g., radio waves generated outside the sanitary washing device such as by a mobile telephone or the like held by a person standing in front of the toilet) easily propagate toward the radio wave sensor. Such a radio wave generated outside also may cause noise when detecting the user. Because the operation of the user standing in front of the open toilet seat is relatively small, the effects of noise become large when the toilet seat is open. Therefore, when the toilet seat is open, if the radio wave sensor is affected by noise such as that described above, the misdetection described above occurs relatively easily.

Conversely, in the embodiment, in the state in which the toilet seat 10 is open, the radio wave sensor 70 does not detect the user in the second region R2 positioned higher. In other words, in the state in which the toilet seat is open, the radio wave sensor 70 does not receive the radio wave passing through the second region R2 toward the radio wave sensor 70. Thereby, the noise that is caused by radio waves other than the reflected wave and is generated outside the sanitary washing device can be reduced. Also, because the radio wave that is radiated upward from the radio wave sensor 70 is blocked by the toilet seat 10 in the state in which the toilet seat 10 is open, the noise that is caused by a reflected wave due to an external device or the like positioned higher can be reduced. Accordingly, the misdetection can be suppressed.

On the other hand, the radio wave sensor 70 detects relatively large operations such as the entrance and exit of the user, etc., in the state in which the toilet seat 10 is closed. Therefore, the effects of the noise when the toilet seat 10 is closed are small compared to when the toilet seat 10 is open. Therefore, in the state in which the toilet seat 10 is closed, the radio wave sensor radiates the radio wave in the first region R1 and the second region R2 and detects the user in a wider range.

If the radio wave that is radiated from the radio wave sensor toward the maximum directivity direction is incident on the toilet seat, there is a risk that the detection accuracy may decrease due to the radio wave being reflected. Conversely, in the embodiment, the maximum directivity direction D passes below the toilet seat 10 in the state in which the toilet seat 10 is open; and the maximum directivity direction D passes above the toilet seat 10 in the state in which the toilet seat 10 is closed. Thereby, in the state in which the toilet seat 10 is open and in the state in which the toilet seat 10 is closed as well, it is easy to reliably detect the user that is in front of the toilet seat 10. Also, in the state in which the toilet seat is open, the radio wave that propagates above the maximum directivity direction D is blocked by the toilet seat 10. Thereby, the noise that is caused by the radio wave propagating above the maximum directivity direction D can be reduced.

For example, the radio wave sensor 70 is disposed more proximal to the toilet seat opening/closing part 50 than to the toilet lid opening/closing part 60. For example, as shown in FIG. 4, a distance L1 between the radio wave sensor 70 and the toilet seat opening/closing part 50 is shorter than a distance L2 between the radio wave sensor 70 and the toilet lid opening/closing part 60. Also, for example, a distance L3 between the radio wave transmitter/receiver 72 and the toilet seat opening/closing part 50 is shorter than a distance L4 between the radio wave transmitter/receiver 72 and the toilet lid opening/closing part 60. Thus, by disposing the radio wave sensor 70 in a position proximal to the toilet seat opening/closing part 50, i.e., a position proximal to the toilet seat 10, the region can be narrow where the radio wave from the radio wave sensor 70 is blocked by the toilet seat 10 in the state in which the toilet seat 10 is open.

The embodiments of the invention have been described above. However, the invention is not limited to the above description. Those skilled in the art can appropriately modify the above embodiments, and such modifications are also encompassed within the scope of the invention as long as they include the features of the invention. For instance, the shape, dimension, material, arrangement, installation configuration and the like of various components in the sanitary washing device 100, the toilet device 200 and the like are not limited to those illustrated, but can be modified appropriately.

Furthermore, various components in the above embodiments can be combined with each other as long as technically feasible. Such combinations are also encompassed within the scope of the invention as long as they include the features of the invention.

What is claimed is:

1. A sanitary washing device, comprising:
   a main part including a toilet lid opening/closing part;
   a toilet lid pivotally supported by the toilet lid opening/closing part to be rotatable with respect to the main part, the toilet lid opening/closing part including a first motor, the first motor being provided in an interior of the main part and opening and closing the toilet lid;
   a radio wave sensor provided in an interior of the main part, the radio wave sensor using a radio wave to detect a user in front of the main part; and
   a toilet seat,
   the radio wave sensor being positioned further frontward than the first motor,
   at least a part of the radio wave sensor overlapping at least a part of the first motor in a horizontal direction,
   the main part further including a toilet seat opening/closing part,
   the toilet seat being pivotally supported by the toilet seat opening/closing part to be rotatable with respect to the main part, the toilet seat opening/closing part including a second motor, the second motor being provided in an interior of the main part and opening and closing the toilet seat,
   the second motor being positioned further frontward than the first motor and the radio wave sensor,
   an upper end of the second motor being positioned lower than an upper end of the first motor,
   a distance between the radio wave sensor and the second motor being shorter than a distance between the radio wave sensor and the first motor.

2. The device according to claim 1, wherein at least a part of the radio wave sensor does not overlap the first motor in a frontward/rearward direction when viewed from above.

* * * * *

UNITED STATES PATENT AND TRADEMARK OFFICE
CERTIFICATE OF CORRECTION

PATENT NO. : 10,731,325 B2  
APPLICATION NO. : 15/992512  
DATED : August 4, 2020  
INVENTOR(S) : Yuta Tanogashira Page 1 of 1

It is certified that error appears in the above-identified patent and that said Letters Patent is hereby corrected as shown below:

In the Specification

Column 5, Line 20, "the controller includes" should be --the controller 74 includes--.

Signed and Sealed this  
Twenty-second Day of December, 2020

Andrei Iancu  
*Director of the United States Patent and Trademark Office*